US012419806B2

(12) United States Patent
Silvestre Duarte et al.

(10) Patent No.: US 12,419,806 B2
(45) Date of Patent: Sep. 23, 2025

(54) MULTI-PURPOSE SINGLE-USE TRANSPORTER FOR BIOPHARMACEUTICAL SOLUTIONS

(71) Applicant: SMARTFREEZ, LDA, Porto Salvo (PT)

(72) Inventors: Andreia Filipa Silvestre Duarte, Sacavém (PT); Pedro Gil Sena Rego, Lisbon (PT); Carlos Duarte Da Silva Completo, Peniche (PT)

(73) Assignee: SMARTFREEZ, LDA, Porto Salvo (PT)

( * ) Notice: Subject to any disclaimer, the term of this patent is extended or adjusted under 35 U.S.C. 154(b) by 90 days.

(21) Appl. No.: 18/256,292

(22) PCT Filed: Jan. 20, 2022

(86) PCT No.: PCT/IB2022/050479
§ 371 (c)(1),
(2) Date: Jun. 7, 2023

(87) PCT Pub. No.: WO2022/157664
PCT Pub. Date: Jul. 28, 2022

(65) Prior Publication Data
US 2024/0099937 A1 Mar. 28, 2024

(30) Foreign Application Priority Data
Jan. 20, 2021 (PT) ........................................ 117024

(51) Int. Cl.
*A61J 1/16* (2023.01)

(52) U.S. Cl.
CPC .................................... *A61J 1/165* (2013.01)

(58) Field of Classification Search
CPC ....... B65D 85/302; B65D 85/305; A61J 1/165
(Continued)

(56) References Cited

U.S. PATENT DOCUMENTS

| | | | | |
|---|---|---|---|---|
| 723,649 A | | 3/1903 | Clifford | |
| 1,540,659 A | * | 6/1925 | John ................... | B65D 85/302 217/52 |

(Continued)

FOREIGN PATENT DOCUMENTS

| | | | |
|---|---|---|---|
| GB | 1486892 | A | 9/1977 |
| WO | 2012140252 | A1 | 10/2012 |
| WO | 2020174338 | A1 | 9/2020 |

OTHER PUBLICATIONS

Andreia Duarte et al., "Interfacial Stress and Container Failure During Freezing of Bulk Protein Solutions Can Be Prevented by Local Heating," AAPS PahrmSciTech, Aug. 2020 (10 pages).

(Continued)

*Primary Examiner* — Chun Hoi Cheung
(74) *Attorney, Agent, or Firm* — Leason Ellis LLP

(57) ABSTRACT

This disclosure describes a system for protection of the bottle or carboys during freezing, storage or transport, and thawing. The system described herein is designed to enable high heat transfer rates under certain conditions, thus enabling to freeze or thaw the biopharmaceutical solutions at optimal rates, without disassembling the protective structure. This disclosure describes a system configured to receive a bottle or carboy filled with biopharmaceutical solutions for freezing, transport and thawing. This system comprises five main parts: a lid; a top cover; a multi-shape compatible top holder; a multi-shape compatible bottom holder and a bottom cover. This system has an opening in the bottom below the container that allows air to be driven through the walls of the bottle and through a side vent. The airflow passage in the system, allows the use of the system for freezing (cold air) or thawing (hot air) while providing physical protection.

16 Claims, 6 Drawing Sheets

(58) Field of Classification Search
USPC ..... 206/521–594, 139–203; 220/4.01–8, 739
See application file for complete search history.

(56) References Cited

U.S. PATENT DOCUMENTS

| | | | | | |
|---|---|---|---|---|---|
| 1,598,534 | A * | 8/1926 | Lefkowitz | B65D 85/302 | 217/52 |
| 1,945,797 | A * | 2/1934 | Bach | B65D 85/302 | 217/52 |
| 2,036,876 | A * | 4/1936 | Kraft | B65D 85/302 | 206/521 |
| 2,417,045 | A * | 3/1947 | Brewer | B65D 85/302 | 217/54 |
| 2,452,195 | A * | 10/1948 | Carl | B65D 85/302 | 215/12.1 |
| 2,515,127 | A * | 7/1950 | Lahey | B65D 85/302 | 217/65 |
| 4,114,759 | A * | 9/1978 | Maloney, Jr. | B29C 45/0025 | 206/508 |
| 4,964,529 | A * | 10/1990 | Houston | F17C 13/084 | 220/601 |
| 5,261,551 | A * | 11/1993 | Watt | B65D 51/18 | 220/798 |
| 6,554,155 | B1 * | 4/2003 | Beggins | B65D 81/3879 | 220/592.2 |
| 6,604,649 | B1 * | 8/2003 | Campi | B65D 81/3886 | 220/592.17 |
| 6,793,076 | B1 * | 9/2004 | Luo | B65D 77/0493 | 206/592 |
| 7,614,516 | B2 * | 11/2009 | Beggins | B65D 81/3881 | 215/393 |
| 2003/0080126 | A1 | 5/2003 | Voute et al. | | |
| 2003/0155274 | A1 * | 8/2003 | Rosler | B65D 59/08 | 206/591 |
| 2012/0187137 | A1 * | 7/2012 | Lee | B65D 81/3886 | 220/739 |

OTHER PUBLICATIONS

International Search Report for PCT Application No. PCT/IB2022/050479 dated Apr. 21, 2022 (4 pages).

* cited by examiner

MULTI-PURPOSE SINGLE-USE TRANSPORTER FOR BIOPHARMACEUTICAL SOLUTIONS

CROSS-REFERENCE TO RELATED APPLICATIONS

This application is a U.S. National Stage Application under 35 U.S.C. § 371 of International Patent Application No. PCT/IB2022/050479, filed Jan. 20, 2022, which claims priority to Portugal Patent Application No. 117024, filed Jan. 20, 2021, the contents of which are each hereby incorporated by reference in their respective entireties.

TECHNICAL FIELD

This disclosure relates, in general, to a single-use system or device for transporting biopharmaceutical solutions in bottles or carboys. This disclosure also relates to a system or device used for homogeneous freezing, thawing, and transporting of biopharmaceutical solutions in bottles and carboys. This disclosure relates, in particular, to a multi-purpose system or device that is easily transported and incremented to other conventional freeze-thaw equipment.

BACKGROUND

Biopharmaceutical solutions are normally produced in large batches and to minimize their degradation over time they are frozen and stored or transported to other locations where, then, they are thawed for use. This process of production—freezing—storage or transport—thawing, despite being widely performed in the daily life of a pharmaceutical industry still presents some challenges. For example, the process of transporting the containers with the frozen biopharmaceutical solutions involves logistic challenges to avoid damage or loss of the biopharmaceutical material due to rupture or damage of the containers, or temperature excursions due to shipping conditions variance and constraints.

Many pharmaceutical companies use bottles or carboys for the storage and transport of their biopharmaceutical solutions as these containers are more robust than bags. However, some of these bottles and carboys use tubbing assemblies that are fragile at frozen storage temperature and can break and lead to the contamination or loss of the biopharmaceutical solution. Although bottles and carboys are robust systems, after freezing the material of these containers becomes more fragile and brittle. In addition, handling these containers, which can range from a few milliliters to a few dozen liters, at very low temperatures (for example −80° C.) can be difficult.

To prevent damage of the containers after freezing, many companies use single-use boxes (for example made of polystyrene) for protection during transportation between locations. However, most of the available boxes are not made to fit with precision for the containers, and the risk of damage may still occur during transport since the box can be too large for a bottle. In addition, it is still necessary to handle the bottle or carboys without protection, from the freezer to the transport box, and there may be an incident in this short process that can lead to significant losses.

Thus, it is necessary to develop a bottle/carboy protection system that can be used in the entire process, from freezing, through transport to thawing, without affecting any of the steps of the process. Therefore, there is a need for a system for protection of bottles or carboys with multiple functions, i.e, a system that can be used during freezing, transportation and thawing to protect the bottle or carboys during cold chain related processes and logistics.

Moreover, it was shown that the isothermal insulation, with a phase-change material, of the top of the bottle prevents the ice crust formation on the top of the liquid, avoiding the increase in pressure inside the containers thus preventing container damage or rupture (in doi:10.1208/s12249-020-01794-x). Therefore, it would be useful to have a system with the above mention characteristics and that also could be used as isothermal insulation of the top of the bottles or carboys during freezing, minimizing the risk of container damage due to pressure.

GENERAL DESCRIPTION

The present disclosure describes a single-use system or device for protection of the bottle or carboys during freezing, storage or transport, and thawing. The single-use system or device described herein is designed to enable high heat transfer rates under certain conditions, thus enabling to freeze or thaw the biopharmaceutical solutions at optimal rates, without disassembling the protective structure.

The present disclosure describes a system or device, preferably a single use system or device, for receiving a bottle or carboy, to be inserted into a bottom holder, filled with biopharmaceutical solutions for freezing, transporting and/or thawing, comprising: a bottom holder with compressible brinks (or edges) to adjust to the shape of the bottle or carboy, for compatibility with bottles or carboys of multiple different shapes, and to firmly secure it in position to allow air to flow between walls of the bottle or carboy and walls of the bottom holder when connected to an air source; and a top holder.

In an embodiment, the compressible brinks are configured as compressible longitudinal protrusions or indentations along an inner wall of the holder in a direction of insertion of the bottle or carboy in the holder, i.e. as the holder receives the inserted bottle or carboy.

In an embodiment, the compressible brinks comprise a lower protrusion for supporting the weight of the bottle or carboy.

In an embodiment, the bottom or top holder further comprise a recess to allow the air flow to escape the system between the top holder and the bottom holder.

In an embodiment, the bottom holder further comprises a vent to allow the air flow to escape the system from the bottom holder.

In an embodiment, the top holder comprises compressible and deformable brinks for compatibility with bottles or carboys of multiple different shapes and to hold the bottle or carboy in place.

In an embodiment, system or device, preferably a single use system or device, that has an opening in the bottom below the container that allows air to be driven through the walls of the bottle and through a side vent. This opening has an air-sealing surface that enables easy connection to an external flow of air at different pressure. The airflow passage in the system allows the use of the system for freezing (cold air) or thawing (hot air) while providing physical protection at all times.

In an embodiment, the system or device, preferably a single-use system or device, is configured to receive a bottle or carboy filled with biopharmaceutical solutions for freezing, transport and thawing.

In an embodiment, the system or device is made of a rigid and resistant material such as a polymer, preferentially expanded polystyrene (EPS), preferably a single-use system or device. In an embodiment. The system or device may also be made of any rigid material such as plastic, polymer, or other material.

In an embodiment, the system or device comprises five main parts: a lid; a top cover; a multi-shape compatible top holder; a multi-shape compatible bottom holder and a bottom cover.

In an embodiment, the multi-shape compatible bottom holder and top holder are design to receive a bottle or carboy.

In an embodiment, the bottom and top holder have a compressible/deformable brink to adjust to shape variations of bottles or carboys of different materials or suppliers.

In an embodiment, the multi-shape compatible bottom holder only receives the bottom part of the bottle or carboy.

In an embodiment, the multi-shape compatible bottom holder has compressible/deformable brinks to maintain the bottle or carboy in the center of the multi-shape compatible bottom holder, allowing the air to flow uniformly between the walls of the bottle and the holder.

In another embodiment, the distance between the walls of the bottle and the bottom holder should be in a range of 0.5 cm to 5 cm, preferentially in the range of 1 cm to 3 cm.

In an embodiment, the multi-shape compatible bottom holder has an opening in the bottom with an air-sealing surface. The air tightness of the air-sealing surface can be improved using a sealant, made from a typical sealing material as rubber or silicone.

In an embodiment, the multi-shape compatible bottom holder may have several pins at the top to connect to the multi-shape compatible top holder.

In another embodiment, the pins can be used to create a vent between the bottom and the top holder, to allow the air to escape during freezing or thawing.

In an embodiment, the multi-shape compatible bottom holder may have handles to facilitate the handling of the system or device.

In an embodiment, the multi-shape compatible top holder is designed to receive the top of the bottle or carboy.

In another embodiment, the multi-shape compatible top holder receives or covers the top half of the bottle.

In an embodiment, the multi-shape compatible top holder is designed to have a cavity between the walls of the bottle and the holder. Said cavity can be filled with a phase-change material.

In another embodiment, the system or device comprises a top cover configured to connect to the multi-shape compatible top holder and receive the tubing assemblies that the bottle may have.

In another embodiment, the system or device comprises a lid to close the top of the system or to easily access the tubing assembling. If the tubing assemblies are present, the lid connects to the top cover and close the system or device. If the tubing assemblies are not present, there is no need to use the top cover and the lid connects directly to the multi-shape compatible top holder.

In another embodiment, the system or device comprises a bottom cover configured to connect to the multi-shape compatible bottom holder and to close the system or device for transporting.

In another embodiment, all the parts of the system or device can be configured as multi-parts. This means that each part can be design as one piece or as multiple pieces that connect to each other.

In another embodiment, the system or device may have grooves between the parts that compose the system to facilitate its assembly or disassembly.

In another embodiment, the system or device may have marked guides where the user can cut the polymer (as EPS) to facilitate the disassembly of the system or device.

Another aspect of this disclosure relates to the main configurations of the single-use system or device:

(1) with a vent between the multi-shape compatible bottom holder and top holder, to freeze and thaw;

(2) completely closed with the bottom cover, for transport.

In another embodiment, for thawing, the system or device can be used without the multi-shape compatible top holder.

Another aspect of this disclosure relates to a method to freeze, transport and thaw biopharmaceutical solutions contained in bottles or carboys using the multi-purpose single-use system or device herein described.

This disclosure relates to a method for freezing the biopharmaceutical solution using the single-use system or device, comprising the following steps:

(1) placing the bottle or carboy with the biopharmaceutical solution in the multi-shape compatible bottom holder;

(2) placing the multi-shape compatible top holder in the top of the bottle, while maintaining an opening vent between the bottom and top holder;

(3) filling the cavity of the top holder with phase-change material;

(4) if present, carefully accommodate the tubing assembly in the top cover and close with the lid;

(5) connect the assembly system to an air source at controlled temperature;

(6) allowing a flow of air until the biopharmaceutical solution completely freezes.

This disclosure also relates to a method for transporting the biopharmaceutical solution using the single-use system or device, comprising the following steps:

(1) close the vent between the bottom and top holder;

(2) closing the system with the bottom cover;

(3) placing the closed system in a transport box;

(4) fill with dry ice, or another material to maintain the selected temperature and transport to the desired location.

In an embodiment, the step of closing the vent can be achieved by pressing down the top holder.

In another embodiment, to close the vent between the bottom and top holder, suitably designed parts can be inserted in the vent. In an alternative embodiment, the vent could be closed with tape, a rubber band, a strap, a plastic wrap, or other means to cover a hole.

This disclosure also relates to a method for thawing the biopharmaceutical solution using the single-use system or device, comprising the following steps:

(1) removing the bottom cover;

(2) opening the vent between the bottom and top holder;

(3) connecting the assembled system or device to a controlled temperature air source;

(4) allowing air to flow until the biopharmaceutical solution completely thaws.

In another embodiment, the step of opening the vent can be achieved by pushing up the top holder.

In another embodiment, to open the vent between the bottom and top holder, the suitably designed parts previously inserted could be removed. In an alternative embodiment, the vent could be opened by removing the tape or the other means used to close it.

In another embodiment, to thaw, the top holder can be completely removed.

In another embodiment, the steps of the methods could be changed according to the biopharmaceutical solution used or the embodiment used.

BRIEF DESCRIPTION OF THE DRAWINGS

These and other objects, features and advantages of the disclosure will be evident from the following detailed description when read in conjunction with the accompanying drawings. For an easier understanding of the disclosure, the attached drawings are joined, which represent preferred embodiments of the disclosure that, however, are not meant to limit the object of the present application.

DETAILED DESCRIPTION

Figure 1A:
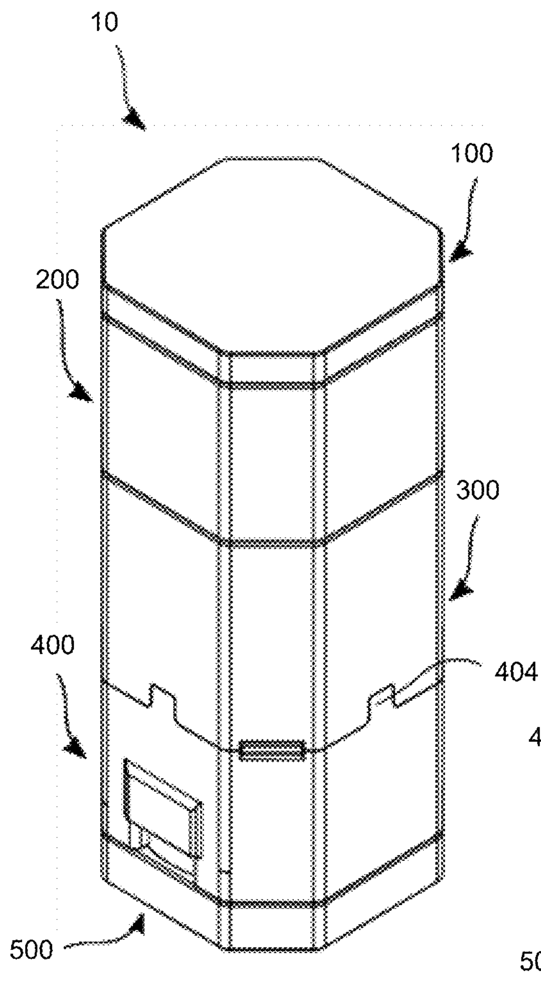
FIG. 1A is an elevated view of a single-use system or device 10 configured to transport a bottle with tubbing assemblies, according to the present disclosure.

As described above, it is necessary to develop a bottle/carboy protection system or device that can be used in the entire cold chain process, including freezing, transport and thawing of biopharmaceutical solutions, without compromising the heat transfer necessary for controlled freezing and thawing rates, which must be optimized to prevent degradation of active substances due to thermal stresses. Therefore, the present disclosure describes a system or device for protection of bottles or carboys with multiple functions, i.e, a system or device that can be used during freezing, transportation and thawing to protect the bottle or carboys during cold chain related processes and logistics. In addition, this system or device ensures homogeneous freezing and thawing, using forced air convection equipment.

The present disclosure relates to a system or device, preferably a single use system or device, for receiving a bottle or carboy filled with biopharmaceutical solutions for freezing, transporting and/or thawing, comprising: a bottom holder with compressible brinks to adjust to the shape of the bottle or carboy, for compatibility with bottles or carboys of multiple different shapes, and to firmly secure it in position to allow air to flow between walls of the bottle or carboy and walls of the bottom holder when connected to an air source; and a top holder.

The present disclosure describes a single-use system or device for protection of the bottle or carboys during freezing, storage or transport, and thawing. Most single-use systems or device currently available for preserving the integrity of the containers during cold chain are designed for reducing or minimizing heat transfer between the container and external conditions, avoiding temperature excursions. Conversely, the single-use system or device described herein is designed to enable high heat transfer rates under certain conditions, thus enabling to freeze or thaw the biopharmaceutical solutions at optimal rates, without disassembling the protective structure.

The present disclosure describes system or device, preferably a single-use system or device, for transport biopharmaceutical solutions in bottles or carboys. This system or device also allows for homogeneous freezing and thawing of biopharmaceutical solutions in bottles and carboys. This system or device is a multi-purpose system that is easily transported and incremented to other conventional freeze-thaw equipment.

The present disclosure describes system or device, preferably a single-use system or device, that has an opening in the bottom below the container that allows air to be driven through the walls of the bottle and through a side vent. This opening has an air-sealing surface that enables easy connection to an external flow of air at different pressure. After frozen, the opening at the bottom of the system or device is closed with a cover and the system or device is ready to be transported. The airflow passage in the system, allows the use of the system for freezing (cold air) or thawing (hot air) while providing physical protection at all times.

In an embodiment, the system or device 10 is configured for transporting biopharmaceutical solutions in bottles or carboy 600 while providing physical protection. Additionally, the system or device is configured to be connected to an air driver, as a ventilator or a compressor, to allow the flow of cold or hot air through the walls 406 of the container as necessary for homogeneous and reproducible freezing and thawing of biopharmaceutical solutions, respectively. (See FIGS. 1 to 6 for example illustration)

In an embodiment, the system or device 10 is a single-use system or device configured to receive a bottle or carboy 600 filled with biopharmaceutical solutions for freezing, transporting and thawing. The single-use system is made of a rigid and resistant material which can also provide protection to drops and heat insulation, such as a polymer, preferentially expanded polystyrene (EPS). The system may also be made of any rigid material such as plastic, polymer, or other material.

In an embodiment, the system or device 10 comprises five main parts: a lid 100; a top cover 200; a multi-shape compatible top holder 300; a multi-shape compatible bottom holder 400 and a bottom cover 500 (See FIGS. 1 to 6 for example illustration).

In an embodiment, the multi-shape compatible bottom holder 400 and top holder 300 are design to receive a bottle or carboy 600. The bottom 400 and top holder 300 are design to receive several shapes of bottles and carboys 600. The bottom 400 and top holder 300 have a compressible/deformable brink 301 to adjust to shape variations of bottles or carboys of different materials or suppliers (See FIGS. 2 to 6, 7 to 9 for example illustration).

In an embodiment, the multi-shape compatible bottom holder 400 is designed to receive the bottom of the bottle or carboy 600. The multi-shape compatible bottom holder 400 only receives the bottom part of the bottle or carboy 600. In another embodiment, the multi-shape compatible bottom holder 400 just receives or covers the bottom half of the bottle. In an embodiment, the multi-shape compatible bottom holder 400 has compressible/deformable brinks 301 to adjust to shape variations of bottle or carboy and to firmly secure its position. In an embodiment, the compressible/deformable brinks 301 maintain the bottle or carboy in the center of the multi-shape compatible bottom holder 400, allowing the air to flow uniformly between the walls of the bottle and the holder 406. In another embodiment, the distance between the walls of the bottle and the holder should be in a range of 0.5 cm to 5 cm, preferentially in the range of 1 cm to 3 cm (See FIGS. 1 to 6 for example illustration).

In an embodiment, the multi-shape compatible bottom holder 400 has an opening at the bottom 402 with an air-sealing surface 403, to minimize air leakage when connected to the air source for allowing an airflow to be driven through the walls of the container. The air tightness of the air-sealing surface 403 can be improved using a sealant made from a typical sealing material as rubber or silicone (See FIG. 2 for example illustration).

In an embodiment, the multi-shape compatible bottom holder 400 may have several pins 404 at the top to connect to the multi-shape compatible top holder 300 to increase the integrity of the system for storage or transport. In another embodiment, the pins 404 can be used to create a vent 405 between the bottom 400 and the top holder 300 to allow the air to escape during freezing or thawing. In an embodiment, the multi-shape compatible bottom holder 400 may have handles 407 to facilitate the handling of the system (See FIGS. 1 to 6 for example illustration).

In an embodiment, the multi-shape compatible top holder 300 is designed to receive the top of the bottle or carboy 600. In another embodiment, the multi-shape compatible top holder 300 receives or covers the top half of the bottle. In an embodiment, the multi-shape compatible top holder 300 has a compressible and deformable brink 301 to firmly secure bottles or carboys with shape variations. In an embodiment, the compressible and deformable brink 301 is positioned in the bottom of the top holder 300 to tighten the bottle 600 not allowing the flow air to pass to the top of the bottle (See FIGS. 1 to 6 for example illustration).

In an embodiment, the multi-shape compatible top holder 300 is designed to have a cavity 302 between the walls of the bottle and the holder. Said cavity 302 can be filled with a phase-change material 303. The phase-change material 303 is preferentially contained in flexible containers, or as bricks of a semisolid material to adjust to the shape of the top of the bottle. Preferentially, the phase-change material is used during freezing or for transporting (See FIG. 4 for example illustration).

In another embodiment, the system or device 10 comprises a top cover 200. Said top cover 200 is configured to connect to the multi-shape compatible top holder 300 and receive the tubing assemblies that the bottle may have. In an embodiment, the top cover 200 is designed to receive the tubing assemblies and protect them during freezing, thawing or transporting. After the frozen process, the tubes become fragile and brittle, therefore, the top cover 200 will protect the tubes from shocks, preventing them from breaking and consequently contamination of the biopharmaceutical solution (See FIGS. 1 to 6 for example illustration).

In another embodiment, the system or device 10 comprises a lid 100, to close the top of the system or to easily access the tubing assembling. If the tubing assemblies are present, the lid 100 connects to the top cover 200 and close the system. If the tubing assemblies are not present, there is no need to use the top cover 200, and the lid 100 connects directly to the multi-shape compatible top holder 300 (See FIGS. 1 to 6 for example illustration).

In another embodiment, the system or device 10 comprises a bottom cover 500. Said bottom cover 500 is configured to connect to the multi-shape compatible bottom holder 400 and to close the system for transporting (See FIGS. 1 to 6 for example illustration).

In another embodiment, all the parts of the system or device 10 can be configured as multi-parts. This means that each part can be design as one piece or as multiple pieces that connect to each other.

In another embodiment, the system or device 10 may have grooves 408 between the parts that compose the system or device 10 in order to facilitate its assembly or disassembly (See FIGS. 1 to 6 for example illustration). In another embodiment, the system or device may have marked guides where the user can cut the polymer (as EPS) in order to facilitate the disassembly of the system or device.

In a preferred embodiment, the single-use system or device herein described is used for freezing, transporting, and thawing biopharmaceutical solutions in bottles or carboys. In a preferred embodiment, the single-use system or device is used as a protective system or device, to transport bottles or carboys with biopharmaceutical solutions (frozen or thawed), avoiding the bottles to suffer shocks or physical stress during the transportation. In an embodiment, the single-use system or device is used for freezing or thawing using conventional freeze-thaw equipment such as cooling or heating chambers.

Figure 1B:
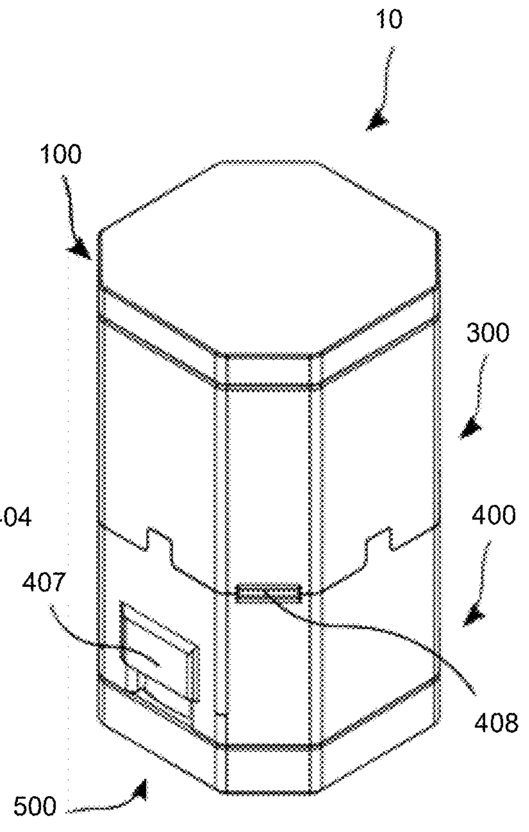
FIG. 1B is an elevated view of a single-use system or device 10 configured to transport a bottle without tubbing assemblies, according to the present disclosure.
Figure 2A:
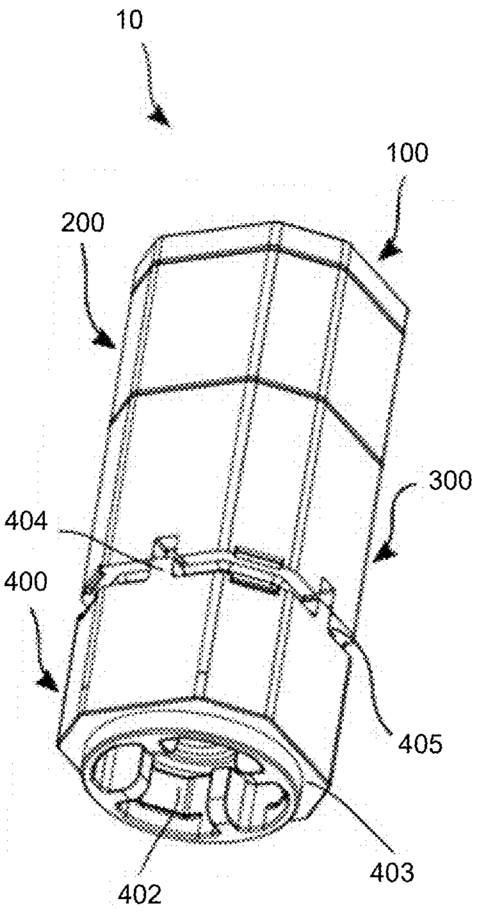
FIG. 2A is a lower view of a single-use system or device 10 configured to freeze/thaw a bottle with tubbing assemblies, according to the present disclosure.
Figure 2B:
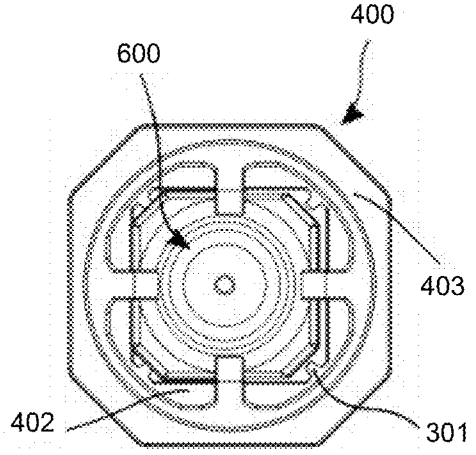
FIG. 2B is a bottom view of a single-use system or device 10 configured to freeze/thaw a bottle, according to the present disclosure.
Figure 3A:
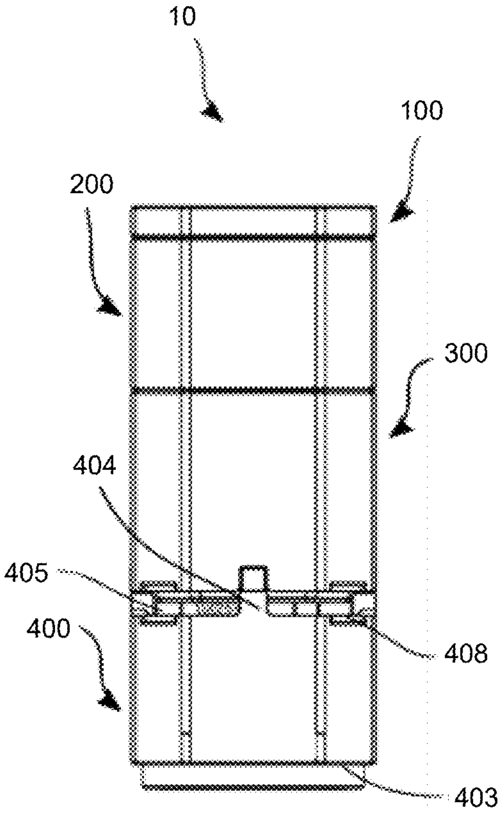
FIG. 3A is a front view of a single-use system or device 10 configured to freeze/thaw a bottle with tubbing assemblies, according to the present disclosure.
Figure 3B:
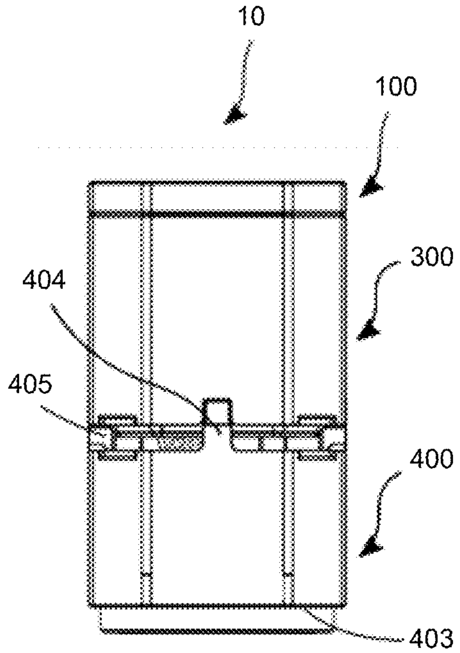
FIG. 3B is a front view of a single-use system or device 10 configured to freeze/thaw a bottle without tubbing assemblies, according to the present disclosure.
Figure 4A:
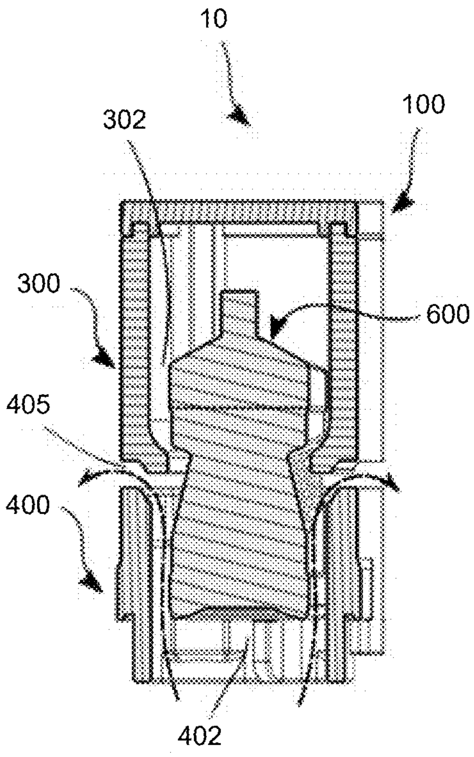
FIG. 4A is a schematic cross-section view of a single-use system or device 10 configured to freeze/thaw a bottle, according to the present disclosure.
Figure 4B:
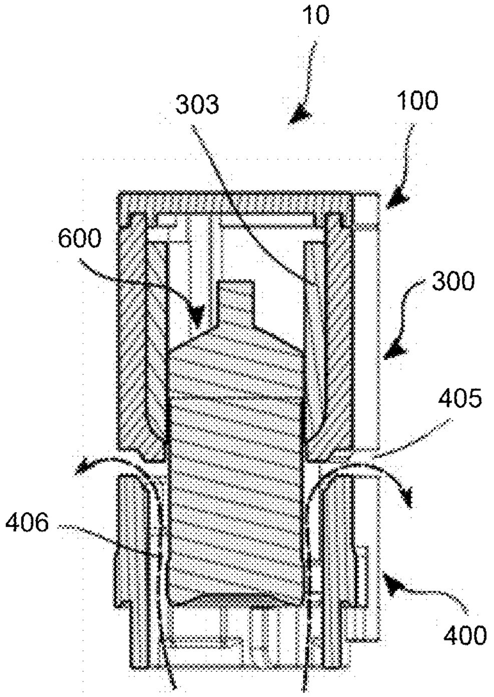
FIG. 4B is a schematic cross-section view of a single-use system or device 10 configured to freeze/thaw a bottle, according to the present disclosure, using phase-change material 303.
Figure 5:
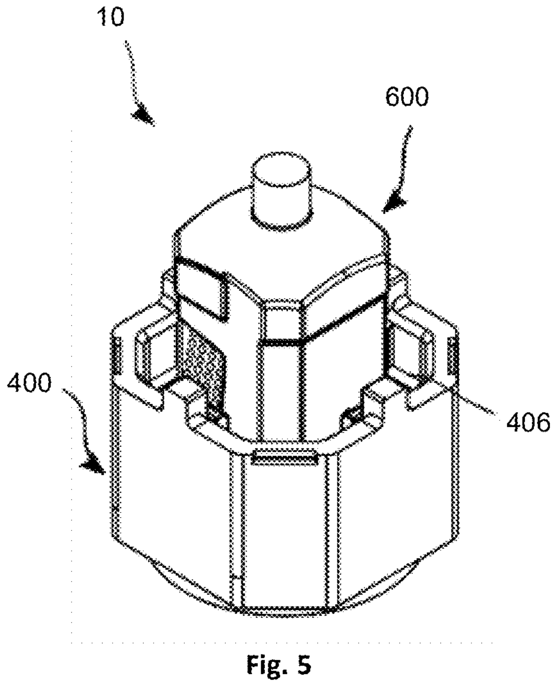
FIG. 5 is an elevated view of a single-use system or device 10 configured preferentially to thaw a bottle, according to the present disclosure, only using the multi-shape compatible bottom holder 400.
Figure 6A:
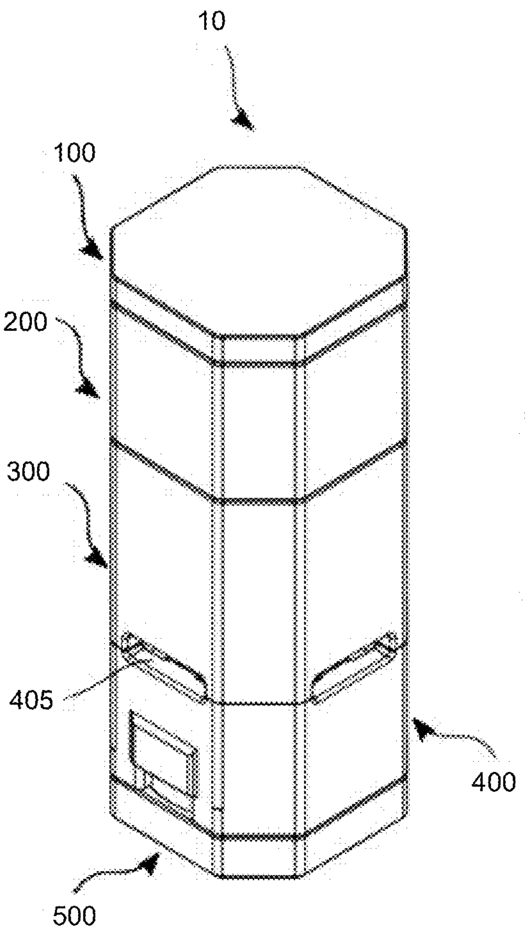
FIG. 6A is an elevated view of another single-use system or device 10 configured to transport a bottle, according to the present disclosure.
Figure 6B:
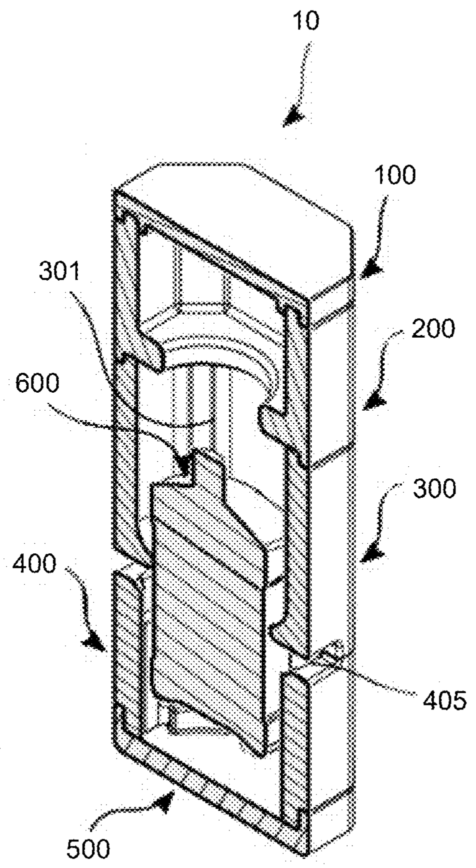
FIG. 6B is a schematic cross-section view of another single-use system or device 10 configured to transport a bottle, according to the present disclosure.
Figure 7:
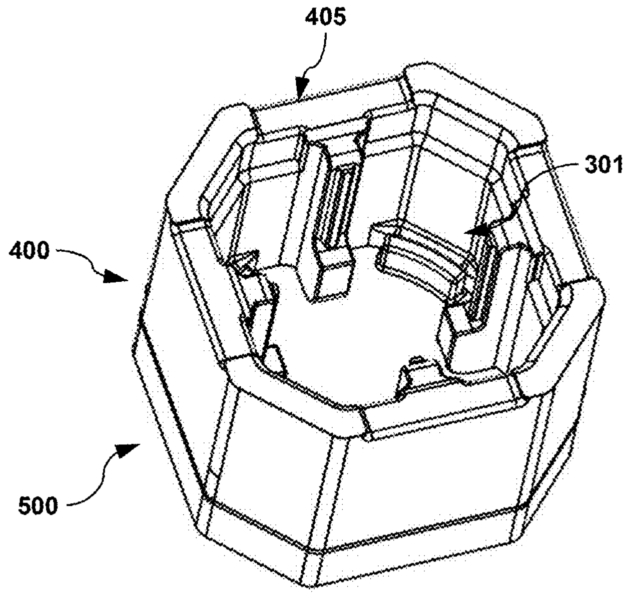
FIG. 7 is a view of an embodiment of the system or device of the present disclosure.
Figure 8:
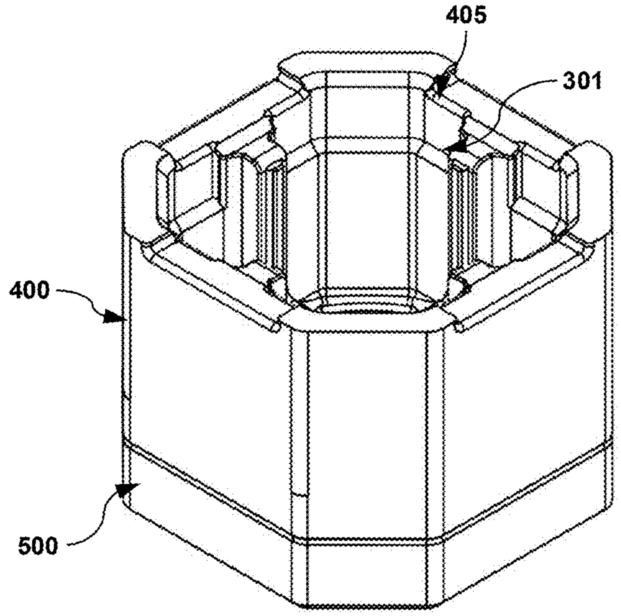
FIG. 8 is a view of an embodiment of the system or device of the present disclosure.
Figure 9:
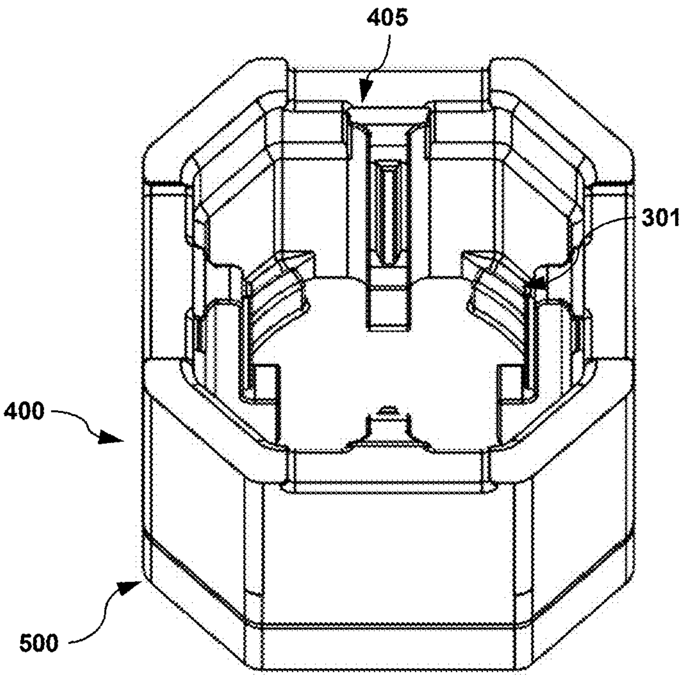
FIG. 9 is a view of an embodiment of the system or device of the present disclosure.

Another aspect of this disclosure relates to a method to freeze, transport and thaw biopharmaceutical solutions contained in bottles or carboys 600 using the previously described multi-purpose single-use system or device 10. Therefore, the single-use system or device has two main configurations: (1) with a vent 405 between the multi-shape compatible bottom holder 400 and top holder 300, to freeze and thaw (FIGS. 2 to 6) and (2) completely closed with the bottom cover 500, for transport (FIGS. 1 and 6). In another embodiment, for thawing, it can be used without the multi-shape compatible top holder 300 (FIG. 5).

This disclosure relates to a method for freezing the biopharmaceutical solution using the single-use system or device 10, comprising the following steps: (1) placing the bottle or carboy 600 with the biopharmaceutical solution in the multi-shape compatible bottom holder 400; (2) placing the multi-shape compatible top holder 300 in the top of the bottle, while maintaining an opening vent 405 between the bottom 400 and top holder 300; (3) filling the cavity 302 of the top holder 300 with phase-change material 303; (4) if present, carefully accommodate the tubing assembly in the top cover 200 and close with the lid 100; (5) connect the assembly system or device 10 to a air source at controlled temperature and (6) allowing a flow of air 406 until the biopharmaceutical solution completely freezes. In another embodiment, the steps of the method could be changed according to the biopharmaceutical solution used or the embodiment used.

This disclosure also relates to a method for transporting the biopharmaceutical solution using the system or device of the present disclosure, preferably single-use system or device 10. As an example, it is described the method of transporting a frozen biopharmaceutical solution, comprising the following steps: (1) close the vent 405 between the bottom 400 and top holder 300; (2) closing the system with the bottom cover 500; (3) placing the closed system or device in a transport box and (4) filling with dry ice, or another material to maintain the selected temperature and transport to the desired location. In another embodiment, the steps of the method could be changed according to the biopharmaceutical solution used and the purpose of transportation. In an embodiment, the step (1) closing the vent 405, can be achieved by pressing down the top holder 300. In another embodiment, to close the vent 405 between the bottom 400 and top holder 300, suitably designed parts can be inserted in the vent. In an alternative embodiment, the vent could be closed with a tape, a rubber band, a strap, a plastic wrap, or other means to cover a hole.

This disclosure also relates to a method for thawing the biopharmaceutical solution using the single-use system or device 10, comprising the following steps: (1) removing the bottom cover 500; (2) opening the vent 405 between the bottom 400 and top holder 300; (3) connecting the assembly system or device to a controlled temperature air source and (4) allowing air to flow 406 until the biopharmaceutical solution completely thaws. In another embodiment, the steps of the method could be changed accordingly to the biopharmaceutical solution used or embodiment used. The top cover 200 should be maintained during thawing if tubing assembly is present. In an embodiment, the step (2) opening the vent 405, can be achieved by pushing up the top holder 300. In another embodiment, to open the vent 405 between the bottom 400 and top holder 300, the suitable designed parts previously inserted could be removed. In an alternative embodiment, the vent could be opened by removing the tape or the other means used to close it. In another embodiment, in the step (2) the top holder 300 can be completely removed (FIG. 5).

In another embodiment, an agitation platform configured to receive the single-use system or device during thawing can be used. Said agitation platform can provide rotation, rocking, shaking, vibrations or other forms of agitation to induce the convection of the liquid inside the bottle or carboy during thawing.

The term "comprising" whenever used in this document is intended to indicate the presence of stated features, integers, steps, components, but not to preclude the presence or addition of one or more other features, integers, steps, components, or groups thereof.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

The disclosure should not be seen in any way restricted to the embodiments described and a person with ordinary skill in the art will foresee many possibilities to modifications thereof. The embodiments described above are combinable. The following claims further set out particular embodiments of the disclosure.

The invention claimed is:

1. A system for receiving a bottle or carboy filled with biopharmaceutical solutions for freezing, transporting or thawing, comprising:

a bottom holder with compressible brinks to adjust to the shape of the bottle or carboy, wherein the bottom holder is configured to be compatible with bottles or carboys of multiple different shapes, and to firmly secure it in position to allow air to flow between walls of the bottle or carboy and walls of the bottom holder when connected to an air source; and a top holder, wherein the bottom or top holder further comprise a recess to allow the air flow to escape the system between the top holder and the bottom holder, wherein the bottom holder comprises an opening at the bottom with an air-sealing surface to enable easy connection to an external flow of air at different pressures, and wherein the air-sealing surface further comprises a rubber sealant or a silicone sealant for improving air tightness of the surface.

2. The system of claim 1, wherein the compressible brinks are configured as compressible longitudinal protrusions or indentations along an inner wall of the holder in a direction of insertion of the bottle or carboy in the holder.

3. The system of claim 1, wherein the bottom holder further comprises a vent to allow the air flow to escape the system from the bottom holder.

4. The system of claim 1, wherein the top holder comprises compressible deformable brinks configured to be compatible with bottles or carboys of multiple different shapes and to hold the bottle or carboy in place.

5. The system of claim 1, wherein the bottom holder further comprises compressible deformable brinks to maintain the bottle or carboy in the center of the holder.

6. The system of claim 1, wherein the distance between the walls of the bottom holder and the walls of the bottle or carboy ranges from 0.5 cm to 5 cm for vertical airflow around the walls of the bottle or carboy.

7. The system of claim 1, wherein the bottom holder comprises pins at the top of the bottom holder.

8. The system of claim 1, wherein the bottom holder comprises handles for handling of the system.

9. The system of claim 1, wherein the top holder further comprises a cavity for filling with a phase-change material.

10. The system of claim 1, further comprising a top cover configured to receive tubing assemblies.

11. The system of claim 1, further comprising a lid to connect to the top holder to close the system.

12. The system of claim 1, further comprising a bottom cover to connect to the bottom holder and to close the system for transporting, wherein each of the compressible brinks comprises a lower protrusion for maintaining a gap between the bottom cover and the bottle or carboy.

13. The system of claim 1, wherein each of the compressible brinks comprises a lower protrusion for supporting the weight of the bottle or carboy.

14. The system of claim 1, wherein each of the bottom holder and the top holder are configured as separate modular parts.

15. The system of claim 1, wherein the system is single-use.

16. The system of claim 1, wherein the distance between the walls of the bottom holder and the walls of the bottle or carboy ranges from 1 cm to 3 cm for vertical airflow around the walls of the bottle or carboy.

* * * * *